(12) United States Patent
Kim

(10) Patent No.: US 8,155,051 B2
(45) Date of Patent: Apr. 10, 2012

(54) APPARATUS AND METHOD FOR REDUCING LATENCY IN THE TRANSMISSION CONTROL PROTOCOL LAYER OF A PORTABLE COMMUNICATION TERMINAL

(75) Inventor: Jong-Yol Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1020 days.

(21) Appl. No.: 11/970,361

(22) Filed: Jan. 7, 2008

(65) Prior Publication Data
US 2008/0165723 A1 Jul. 10, 2008

(30) Foreign Application Priority Data
Jan. 5, 2007 (KR) .................... 10-2007-0001384

(51) Int. Cl.
*H04B 7/185* (2006.01)
(52) U.S. Cl. ...................... 370/318; 455/522
(58) Field of Classification Search .............. None
See application file for complete search history.

(56) References Cited

U.S. PATENT DOCUMENTS

| | | | | |
|---|---|---|---|---|
| 6,266,527 | B1 * | 7/2001 | Mintz | 455/423 |
| 2002/0124096 | A1 * | 9/2002 | Loguinov et al. | 709/230 |
| 2002/0150048 | A1 * | 10/2002 | Ha et al. | 370/231 |
| 2004/0165543 | A1 * | 8/2004 | Nakazawa | 370/252 |
| 2005/0070246 | A1 | 3/2005 | Qazi et al. | |
| 2008/0025216 | A1 * | 1/2008 | Singh et al. | 370/231 |

FOREIGN PATENT DOCUMENTS

| | | |
|---|---|---|
| JP | 09-186739 | 7/1997 |
| KR | 1020010052164 | 6/2001 |
| KR | 1020020059701 | 7/2002 |
| KR | 1020050099759 | 10/2005 |
| KR | 1020060007869 | 1/2006 |

OTHER PUBLICATIONS

Chang-Jung Kao et al.: "Improving TCP Performance in Heterogeneous Mobile Networks", Vehicular Technology Conference, Apr. 22, 2003.
V. Paxson et al.: "Computing TCP's Retransmission Timer; rfc2988. txt", IETF Standard, Internet Engineering Task Force, Nov. 1, 2000.

* cited by examiner

*Primary Examiner* — Chi Pham
*Assistant Examiner* — Kouroush Mohebbi
(74) *Attorney, Agent, or Firm* — The Farrell Law Firm, P.C.

(57) ABSTRACT

Improving a transmission latency of a Transmission Control Protocol (TCP) is provided. The apparatus includes a communicator transmitting a message for measuring power of a transmission signal to a radio access station (RAS) and receiving a response message corresponding to the message from the RAS; a TCP manager instructed by a controller to check and store a round trip time (RTT) required for receiving an acknowledgement (ACK) corresponding to data, which is transmitted from the portable terminal to the RAS; and the controller instructing the TCP manager to measure the RTT for measuring a retransmission timeout (RTO).

20 Claims, 7 Drawing Sheets

APPARATUS AND METHOD FOR REDUCING LATENCY IN THE TRANSMISSION CONTROL PROTOCOL LAYER OF A PORTABLE COMMUNICATION TERMINAL

PRIORITY

This application claims priority under 35 U.S.C. §119 to an application filed in the Korean Intellectual Property Office on Jan. 5, 2007, entitled "Apparatus And Method For Reducing Latency In The Transmission Control Protocol Of A Portable Communication Terminal" and assigned Serial No. 2007-0001384, the contents of which are incorporated herein by reference.

BACKGROUND OF THE INVENTION

1. Field of the Invention

The present invention relates generally to an apparatus and a method for improving the latency of a Transmission Control Protocol (TCP) layer, and in particular, to an apparatus and a method for improving the latency of a TCP layer using a congestion control technique and a power control technique, which are used in the Institute of Electrical and Electronics Engineers (IEEE) 802.16e standards.

2. Description of the Related Art

Wired Internet services through various applications have been developed as representative data communication systems. Also, cellular and Personal Communication Services (PCS) technology is settled as a universal voice communication means.

Users have recently been able to use broadband multimedia services using portable terminals, which do not require the use of cable even during their movements, wherein the broadband multimedia services include text-based Internet searches, E-mail transmissions and receipts, File Transfer Protocol (FTP) in electronic commerce, etc., Telnet, etc.

The above-mentioned services are application programs based on Transmission Control Protocol/Internet Protocol (TCP/IP), which provide reliability between terminators.

TCP provides an efficient congestion control function, which can be divided into a section for measuring a usable bandwidth of a network and a section for checking that a data transmission amount has reached the limit of the network and performing congestion avoidance.

The congestion control function refers to a technique for controlling the size of a TCP transmission window so that the TCP transmission window avoids a congestion state in order to operate well. The congestion control technique adopts four algorithms, i.e., Slow Start, Congestion Avoidance, Fast Retransmit, and Fast Recovery. The congestion control technique will be described in detail below.

Figure 1A:
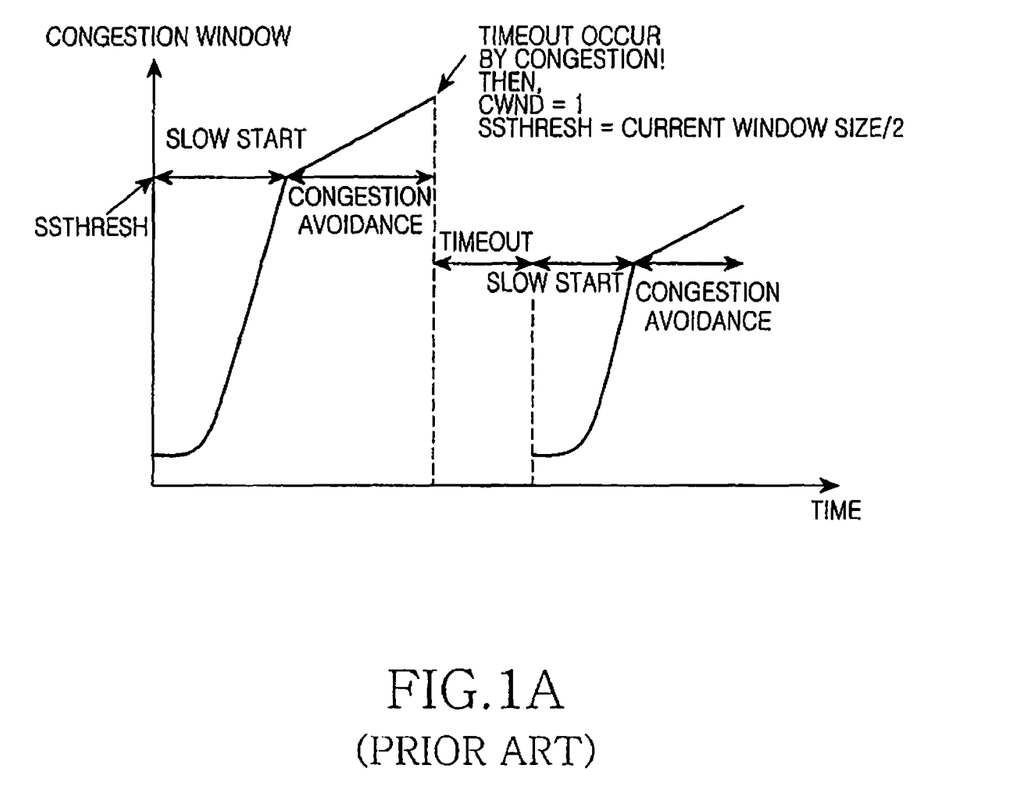
FIGS. 1A and 1B illustrate congestion control techniques of a conventional Transmission Control Protocol (TCP)
Figure 1B:
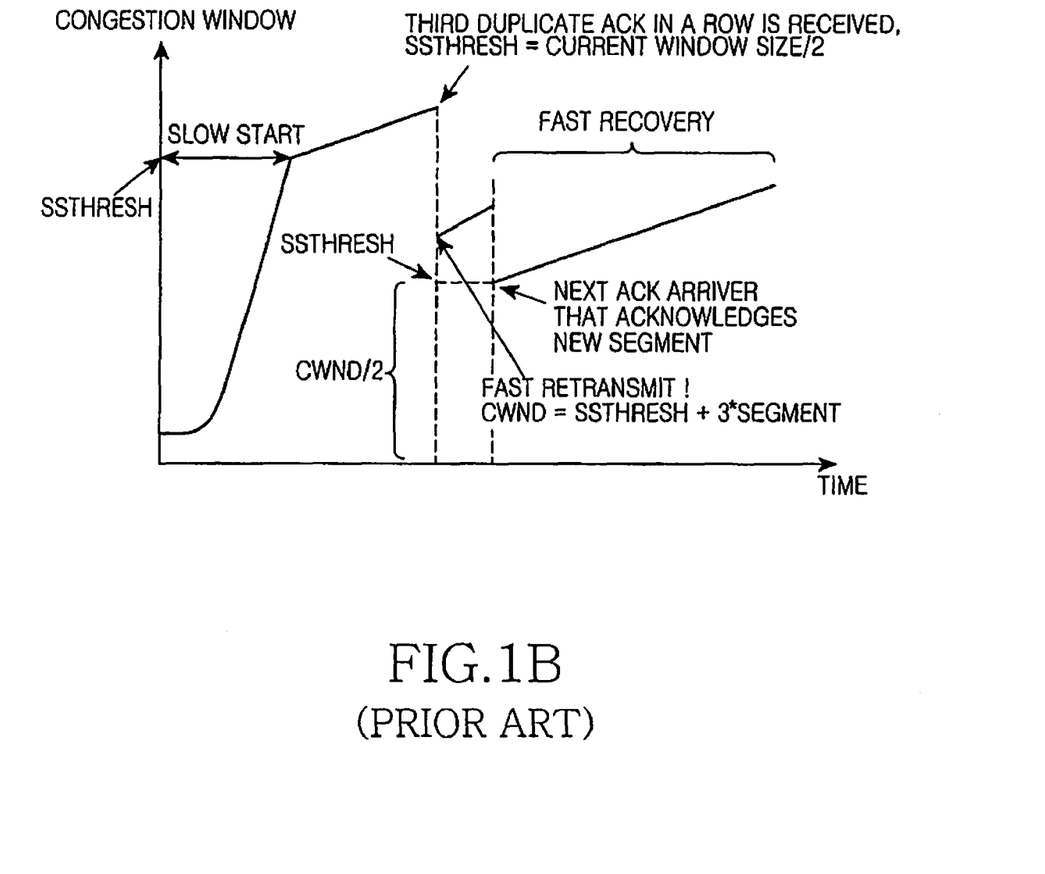

FIGS. 1A and 1B illustrate congestion control techniques of a conventional TCP.

FIG. 1A illustrates Slow Start and Congestion Avoidance steps of the congestion control technique of the conventional TCP.

Referring to FIG. 1A, the Slow Start step starts from observing if ACKnowledgement (ACK), the rate of a new packet going into a network, is the rate received through the Slow Start step.

A congestion window "cwnd" is used in the Slow Start step. In any case, a TCP layer selects the smaller of the value of a credit window and the value of the congestion window "cwnd" to transmit data. Here, the congestion window "cwnd" is used to start a connection to a transport protocol layer and reduce traffic congestion, and the credit window refers to a window, which checks the remaining amount of credit except for an ACK, which has been most lately received.

If a new connection is set, the congestion window "cwnd" is initialized to one segment and then increased by one segment whenever an ACK is received. A transmitter can also transmit the minimum value of the congestion window "cwnd."

If the transmitter receives an ACK, the congestion window "cwnd" can be increased from "1" to "2," and two segments can be transmitted. If the two segments are confirmed, the congestion window "cwnd" is increased to "4." Thus, since the receiver delays the ACK, it is exponentially increased. As a result, the value of the congestion window "cwnd" is exponentially increased.

If the value of the congestion window "cwnd" of the Slow Start step exceeds a slow start threshold "ssthresh," the Slow Start step is changed into a Congestion Avoidance step. The Congestion Avoidance step is an algorithm independent of the Slow Start step. However, if congestion occurs on a network, the TCP must lower the transfer rate of packets to the network. Thus, the Slow Start step occurs. As a result, the Slow start and Congestion Avoidance steps are correlated with each other.

Two parameters are used in the Congestion Avoidance and Slow Start steps. The congestion window "cwnd" and the low start threshold "ssthresh" correspond to the two parameters.

The Congestion Avoidance step uses a method of sizing the dynamic window on congestion. In general, when congestion occurs, a large amount of time is required to recover from the congestion. Thus, the exponential increase of the congestion window "cwnd" in the Slow Start step causes too much data to be transmitted and congestion to be worsened.

Accordingly, a method of linearly increasing the congestion window "cwnd" has been suggested as follows.

In other words, if timeout occurs, the slow start threshold ssthresh is set to half of the value of the congestion window "cwnd," and the congestion window "cwnd" is set to "1." Also, the Slow Start step continues until the size of the congestion window "cwnd" is equal to the slow start threshold "ssthresh."

FIG. 1B is a graph illustrating Fast Retransmit and Fast Recovery steps of the congestion control technique of the TCP.

Referring to FIG. 1B, the Fast Retransmit step is used when a predetermined number of duplicate ACKs are received. If a predetermined number or more of duplicate ACKs are received in the Fast Retransmit step, a segment having a corresponding sequence number is regarded as being lost and retransmitted so that timeout does not occur.

In other words, if consecutive duplicate ACKs greater than or equal to a retransmit threshold are received, the transmitter immediately retransmits the corresponding segment regardless of the termination of the retransmission timer. Here, the retransmit threshold is generally set to "3."

After the segment regarded as being lost in the Fast Retransmit step is retransmitted, the Fast Recovery step starts. The congestion window "cwnd" is increased in the Fast Recovery step whenever a duplicate ACK is received, and a new segment is transmitted based on the increased congestion window "cwnd."

If an ACK of the lost segment is received, the Fast Recovery step terminates, and the Congestion Avoidance step starts. The Fast Recovery step is efficient when the Bandwidth-Delay Product (BDP) is high.

If the Fast Recovery step is not used, the Congestion Avoidance step starts after the Fast Retransmit step.

The TCP is a layer-based protocol, which was initially developed for the wired network and is now used for both the wired network together with a wireless network. Thus, when handover occurs between the wire and wireless networks, transmission latency occurs in the TCP.

Figure 2:
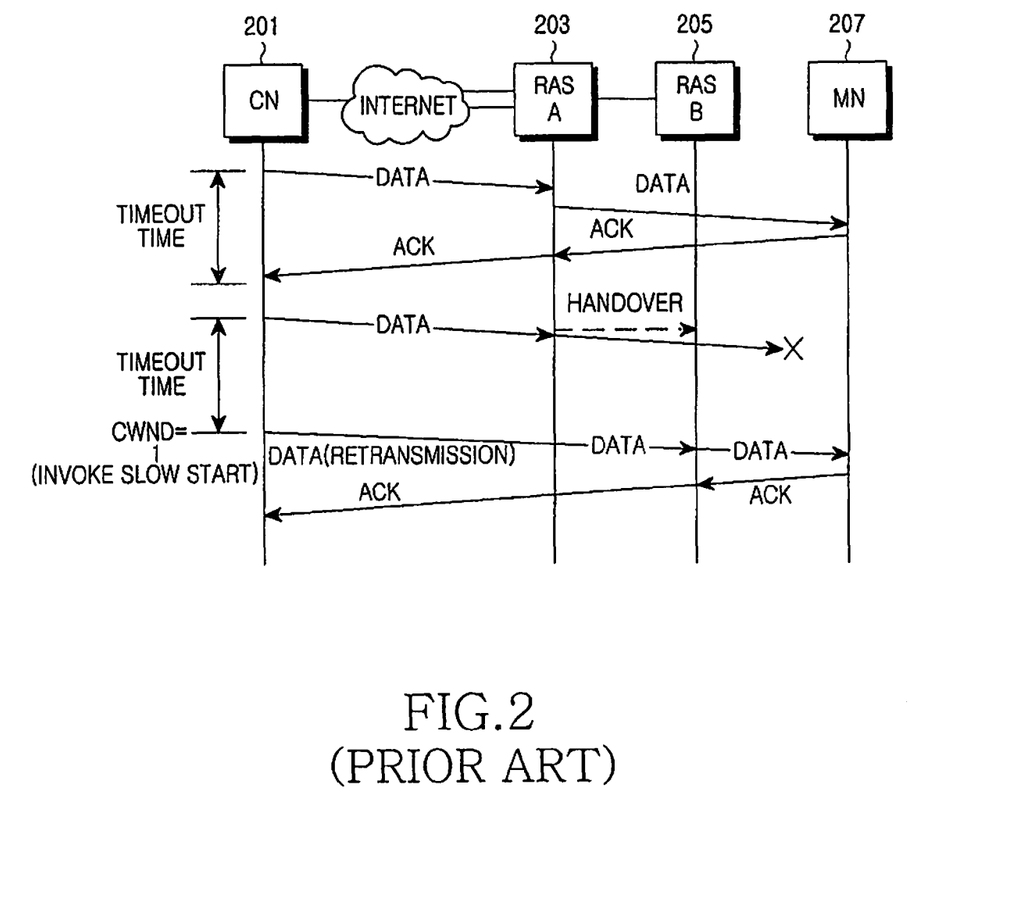
FIG. 2 illustrates a degradation of a connection performance of a conventional TCP occurring when handover is performed between mobile communication systems.

FIG. 2 illustrates the degradation of a connection performance of a TCP occurring when handover is performed between portable communication systems.

Referring to FIG. 2, a core network (CN) 201 transmits data to a mobile node (MN) 207 through a radio access station A (RAS) 203.

If MN 207 performs handover from RAS A 203 to an RAS B 205, MN 207 cannot receive the data transmitted from the CN 201 or an ACK corresponding to the data.

In this case, CN 201 recognizes that congestion occurs on a network and thus operates Slow Start and Congestion Avoidance, which are congestion control algorithms, in order to reset a size of a congestion window "cwnd" to "1."

If MN 207 completes the handover to RAS B 205, the congestion window "cwnd" restarts at a minimum size for data transmitted through RAS B 207. As a result, TCP's speed becomes slower.

SUMMARY OF THE INVENTION

An aspect of the present invention is to solve at least the above problems and/or disadvantages and to provide at least the advantages below. Accordingly, an aspect of the present invention is to provide an apparatus and a method for effectively using in a wireless network a Transmission Control Protocol (TCP), which was developed for a wired network.

Another aspect of the present invention is to provide an apparatus and a method for preventing TCP latency in a portable terminal using a power control technique of a broadband mobile communication network, which is defined in Institute of Electrical and Electronics Engineers (IEEE) 802.16e.

According to one aspect of the present invention, there is provided a portable terminal for reducing TCP latency, including a communicator transmitting a message for measuring the power of a transmission signal to a radio access station (RAS) and receiving a response message corresponding to the message from the RAS; a TCP manager instructed by a controller to check and store the round trip time (RTT) required for receiving an acknowledgement (ACK) corresponding to data which is transmitted from the portable terminal to the RAS; and the controller instructing the TCP manager to measure the RTT for measuring the retransmission timeout (RTO).

According to another aspect of the present invention, there is provided a method for reducing a TCP latency in a portable terminal, including checking an RTT required for receiving an ACK corresponding to data, which is transmitted from the portable terminal to an RAS; and storing the RTT.

According to a further aspect of the present invention, there is provided a method for setting a TCP retransmission timer in a portable terminal, including if n event for setting the TCP retransmission timer occurs, obtaining a pre-stored RTT; measuring power of a transmission signal of the portable terminal; measuring an RTO using the RTT and the power of the transmission signal; and setting the TCP retransmission timer using the measured RTO.

According to still another aspect of the present invention, there is provided a method of setting a TCP retransmission timer in a portable terminal, which performs a handover process, including if an event for setting a TCP retransmission timer occurs, obtaining a pre-stored RTT; measuring power of a transmission signal of the portable terminal and a handover latency time; measuring an RTO using the RTT, the power of the transmission signal, and the handover latency time; and setting the TCP retransmission timer using the RTO.

According still to a further aspect of the present invention, there is provided a method of reducing a TCP latency in a portable terminal, including checking and storing an RTT necessary for setting a TCP retransmission timer and measuring the RTT and power of a transmission signal of the portable terminal to set the RTO when setting the TCP retransmission timer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and a method for improving the performance of a Transmission Control Protocol (TCP) in a portable terminal using a power control technique, which is defined in a broadband mobile communication network, and a congestion control technique of the TCP.

Figure 3:
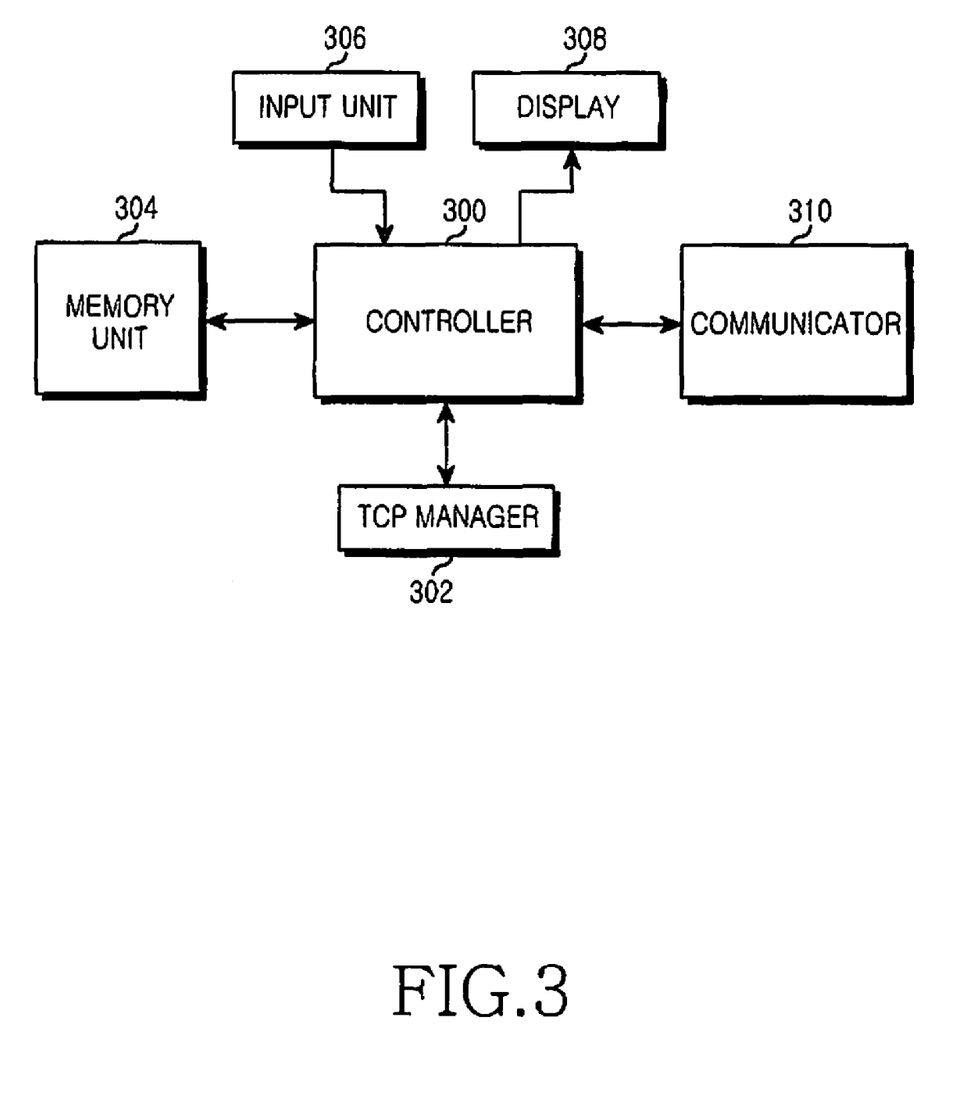
FIG. 3 is a block diagram of a portable terminal setting a TCP retransmission timer according to the present invention.

Referring to FIG. 3, the portable terminal includes a controller 300, a TCP manager 302, a memory unit 304, an input unit 306, a display 308, and a communicator 310.

Controller 300 controls the overall operation of the portable terminal. For example, controller 300 performs processing and controlling for voice and data communications. According to the present invention, besides the normal function of processing and controlling, if controller 300 checks a communication linkage to a radio access station (RAS), controller 300 instructs TCP manager 302 to check the time when receiving an acknowledgement (ACK) corresponding to data, which is transmitted from the portable terminal to the RAS, i.e., a substantial round trip time (RTT) required for returning the ACK to a transmitter, and then to store the ACK in memory unit 304.

If an event for setting a TCP retransmission timer occurs, controller 300 instructs TCP manager 302 to obtain the RTT stored in memory unit 304 and transmitted power of the portable terminal and then set the TCP retransmission timer using the RTT and the transmitted power.

TCP manager 302 is instructed by controller 300 to set the RTT and the TCP retransmission timer.

Memory unit 304 includes a read only memory (ROM), a random access memory (RAM), and a flash ROM. The ROM stores micro-codes of a program for the processing and controlling operations of controller 300 and various types of reference data.

The RAM is a working memory of controller 300 and stores temporary data, which is generated during executions of various programs. The Flash ROM stores various types of updatable storage data including a phonebook, a transmitted message, a received message, etc. According to the present invention, the Flash ROM stores the RTT measured by the TCP.

Input unit 306 includes a plurality of function keys including numerical key buttons from "0" to "9," a menu button, a cancel (delete) button, a confirm button, a talk button, an end button, an Internet access button, navigation key (or direction key) buttons, character input key buttons, etc. Input unit 306 also provides controller 300 with key input data corresponding to a key pressed by a user.

Display 308 displays state information, limited numerical characters, a plurality of moving pictures, a plurality of still pictures, etc. which are generated during the operation of the portable terminal. Display 308 may be a color liquid crystal display (LCD).

Communicator 310 transmits and receives a radio frequency (RF) signal of data input and output through an antenna (not shown). For example, if the data is transmitted, communicator 310 performs channel coding and spreading on the data to be transmitted and upconverts the RF signal to transmit the data. If the data is received, communicator 310 converts the RF signal into a baseband signal and performs despreading and channel decoding on the baseband signal to recover the data.

Controller 300 may operate as TCP manager 302. In the present invention, TCP manager 302 is illustrated separately from controller 300 to separately describe functions of TCP manager 302 and controller 300. Thus, if the portable terminal is substantially realized, controller 300 may process the function thereof and the function of TCP manager 302.

Figure 4:
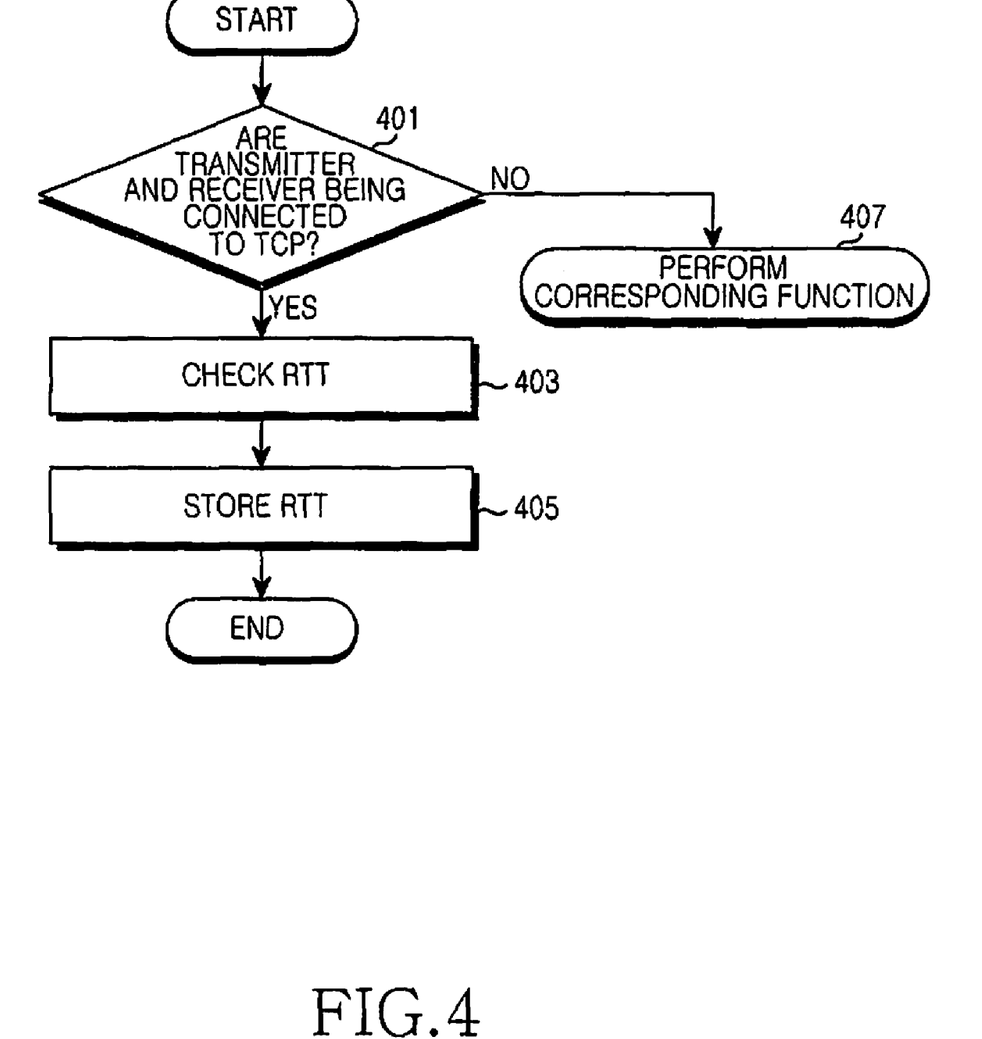
FIG. 4 is a flowchart of a process of reducing a TCP latency of a in a portable terminal according to an embodiment of the present invention.

Referring to FIG. 4, in step 401, controller 30 of the portable terminal determines if a transmitter and a receiver are being connected to a TCP. If it is determined in step 401 that the transmitter and the receiver are not being connected to the TCP, controller 300 goes to step 407 to perform a corresponding function, e.g., maintain an idle state.

If it is determined in step 401 that the transmitter and the receiver are being connected to the TCP, controller 300 proceeds to step 403 to instruct TCP manager 302 to measure an RTT.

Here, the RTT refers to an RTT substantially required for returning an ACK to the transmitter.

In step 405, controller 300 stores the measured RTT in memory unit 304 and then ends the present process.

Figure 5:
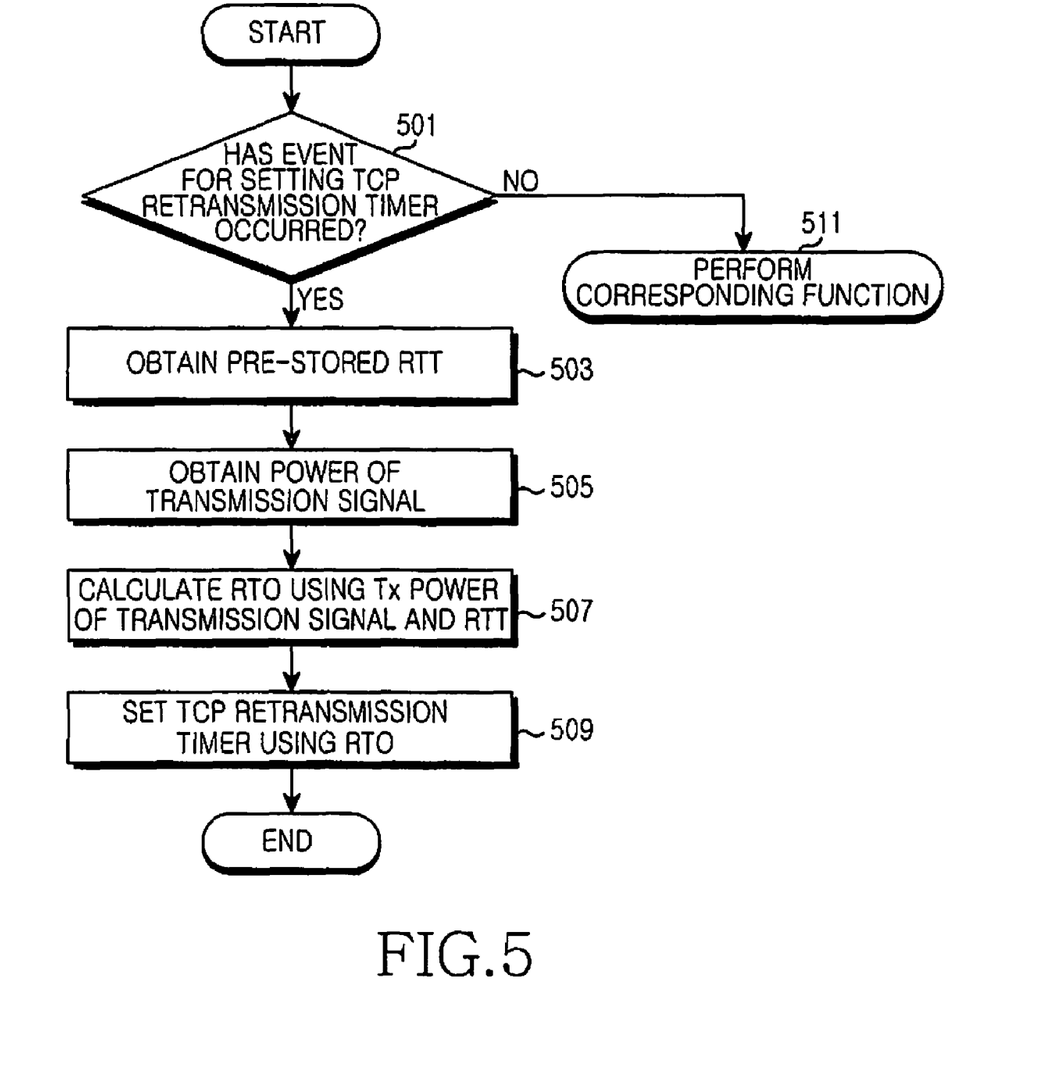
FIG. 5 is a flowchart of a process of setting a TCP retransmission timer in a portable terminal according to the present invention.

Referring to FIG. 5, in step 501, controller 300 of the portable terminal determines if an event for setting a TCP retransmission timer has occurred. If it is determined in step 501 that the event has not occurred, controller 300 goes to step 511 to perform a corresponding function, e.g., maintain an idle state.

If it is determined in step 501 that the event has occurred, controller 300 proceeds to step 503 to obtain an RTT of pres-stored RTTs corresponding to a path to be connected.

In step 505, controller 300 measures power (Tx power) of a transmission signal. Here, the Tx power may be measured using a power control method, which has been used in a broadband mobile communication network. In other words, controller 300 may measure the Tx power of the transmission signal using Equation 1 below:

$$P_{New} = P_{last} + (C/N_{New} - C/N_{last}) - (\log 10(R_{New}) - \log 10(R_{last})) + \text{Offset} \quad (1)$$

where $P_{new}$ denotes temporary power of a transmission signal, $P_{last}$ denotes last power of the transmission signal, $C/N_{new}$ denotes a carrier-to-noise ratio (CNR), which is newly designated at a forward error correction (FEC) modulation rate of an Uplink Interval Usage Code (UIUC), $C/N_{last}$ denotes a CNR designated at a FEC modulation rate, which is used during a last modulation, $R_{new}$ denotes a number of retransmissions for newly designating the FEC modulation rate of the UIUC, $R_{last}$ denotes a number of retransmissions performed at the FEC modulation rate which is lastly used, and Offset denotes a power modification limit accumulation which, is transmitted from a base station (BS) while retransmission is performed.

Table 1 below shows normalized CNRs, which are used to calculate the Tx power.

TABLE 1

| Modulation/FEC Rate | Normalized C/N |
| --- | --- |
| ACK Region | −3.0 |
| FAST FEEDBACK | 0 |
| CDMA Code | 3 |
| QPSK ⅓ | 0.5 |
| QPSK ½ | 6 |
| QPSK ⅔ | 7.5 |
| QPSK ¾ | 9 |
| Sounding Transmission | 9 |
| 16-QAM ½ | 12 |
| 16-QAM ⅔ | 14.5 |
| 16-QAM ¾ | 15 |
| 16-QAM ⅚ | 17.5 |
| 64-QAM ½ | 18 |
| 64-QAM ⅔ | 20 |
| 64-QAM ¾ | 21 |
| 64-QAM ⅚ | 23 |

Here, if the portable terminal receives from the BS a report request message "REP-REQ" for requesting a received signal status of the portable terminal, the portable terminal transmits to the BS a report response message "REP-RSP" corresponding to the report request message "REP-REQ" together with the received signal status of the portable terminal.

In other words, the portable terminal reports the Tx power of the transmission signal thereof to the BS using the report response message "REP-RSP."

Tables 2 and 3 below show formats and types of the report request message "REP-REQ," and Tables 4 and 5 below show formats and types of the report response message "REP-RSP."

TABLE 2

| Name | Type | Length | Value |
| --- | --- | --- | --- |
| Report Request | 1 | Variable | Compound |

As shown in Table 2 above, the report request message "REP-REQ" includes a field "Report Request."

TABLE 3

| Name | Type | Length | Value |
|---|---|---|---|
| Report Type | 1.1 | 1 | bit #0 = 1 Include DFS Basic report<br>bit #1 = 1 Include CINR report<br>bit #2 = 1 Include RSSI report<br>bit #3-6\in multiples of 1/32<br>(range [1/32, 16/32])<br>bit #7 = 1 Include current transmit power report |
| Channel Number | 1.2 | 1 | Physical channel number(see 8.5.1) to be reported on.<br>(License exempt bands only) |
| Channel Type Request | 1.3 | 1 | 00 = Normal subchannel,<br>01 = Band AMC Channel,<br>10 = Safety Channel,<br>11 = Reserved |

As shown in Table 3 above, the report request message "REP-REQ" includes a type of a report or a number and a type of a channel.

The field "Report Type" of the report request message "REP-REQ" includes information as to Dynamic Frequency Selection (DFS), a Carrier to Information Noise Ratio (CINR), a Received Signal Strength Indication (RSSI), etc.

A field "Channel Number" indicates a number of a physical address carrying the report request message "REP-REQ," and a field "Channel Type Request" denotes a type of the channel.

TABLE 4

| Name | Type | Length | Value |
|---|---|---|---|
| Report | 1 | Variable | Compound |
| Channel type Report in WirelessMAN - OFDMA PHY | 2 | Variable | Compound |
| Current transmitted power | 147 | 1 | See 8.3.7.4 and 11.1.1 |

As shown in Table 4 above, the report response message "REP-RSP" includes a field "Report", a field "Channel type Report in WirelessMAN—OFDMA PHY", and a field "Current transmitted power".

Here, the field "Current transmitted power" includes information regarding the Tx power of the transmission signal of the portable terminal and complies with details of 8.3.7.4 (Power Control) defined in IEEE 802.16e and 11.1.1 (Current transmit power) indicating power of a signal carrying the report response message "REP-RSP."

TABLE 5

| REP-REQ Report Type | Name | Type | Length | Value |
|---|---|---|---|---|
| bit#0 = 1 | Channel number | 1.1 | 1 | Physical channel number to be reported on. |
| bit#0 = 1 | Start Frame | 1.2 | 2 | Frame number in which measurement for this channel started. |
| bit#0 = 1 | Duration | 1.3 | 3 | Cumulative measurement duration on the channel in multiples of Ts. For any value exceeding 0xFFFFFF, Report 0xFFFFFF. |
| bit#0 = 1 | Basic Report | 1.4 | 1 | Bit#0: Wireless Human detected on the channel<br>Bit#1: Unknown transmission detected on the channel<br>Bit#2: Primary User detected on the channel<br>Bit#3: Unmeasured. Channel not measured |
| bit#1 = 1 | CINR Report | 1.5 | 2 | 1 byte: mean<br>1 byte: standard deviation |
| bit#2 = 1 | RSSI Report | 1.6 | 3 | 1 byte: mean<br>1 byte: standard deviation |

As shown in Table 5 above, the report response message "REP-RSP" includes a number of a channel of a report, a start frame of the channel, etc.

The field "Channel number" denotes the number of a channel carrying the report response message "REP-RSP," and the field "Start Frame" denotes the number of the start frame of the channel. Other fields include information regarding a Carrier to Interference Noise Ratio (CINR) and RSSI information.

Here, the information regarding the CINR and the RSSI complies with 8.2.2 (Channel Quality measurements), 8.3.9 (Channel Quality measurements), and 8.4.11 (Channel Quality measurements), which are defined in IEEE 802.16e.

If the Tx power of the transmission signal is completely measured in step 505, controller 300 proceeds to step 507 to measure a retransmission timeout (RTO) using the RTT obtained in step 503 and the Tx power obtained in step 505.

Here, controller 300 may set the RTO using Equation 2 below:

$$RTO = SRTT + \max(G, K*RTTVAR) + (1 - TXPWRVAR) \qquad (2)$$

where SRTT denotes an estimate of a smoothed round trip time and is defined as "SRTT<-R"; RTTVAR denotes an estimate of a round trip time variation and is defined as "RTTVAR<-R/2" and R denotes a first measured RTT, and K is defined as "K=4", where SRTT, RTTVAR. Also, it is assumed that "TXPWRVAR" denotes a coefficient value of the Tx power of the transmission signal measured using a Wireless Broadband Internet (WiBro) power control technique, and G denotes a clock granularity.

If the first RTT is measured, and then an RTT R' is re-measured, the SRTT may be calculated using the expresssion "$(1\alpha)*SRTT+\alpha*R'$", and the RTTVAR may be calculated using the expression "$(1-\beta)*RTTVAR+\beta*|SRTT-R'|$", where $\alpha$ and $\beta$ denote smoothing factors for much or less weighting histories of RTT samples.

In step 509, controller 300 sets a TCP retransmission timer using the measured RTO and then ends the present process.

Figure 6:
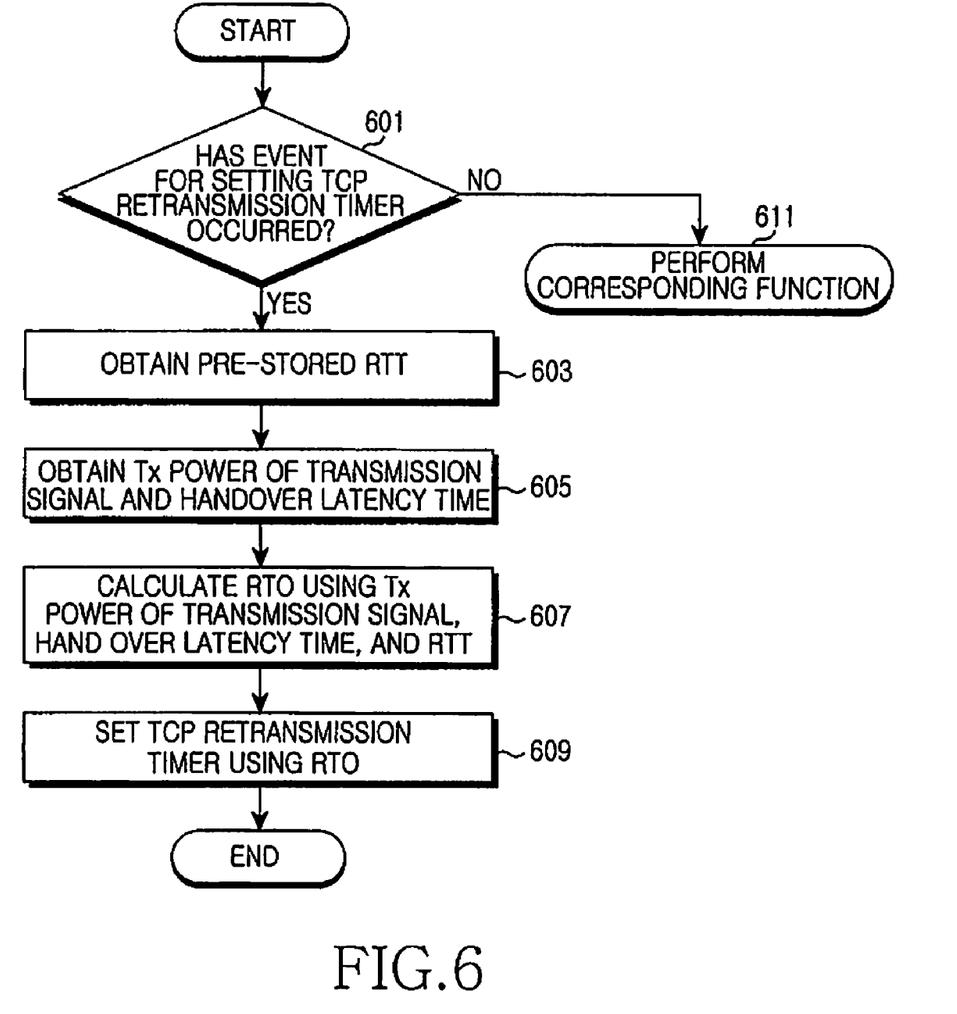
FIG. 6 is a flowchart of a process of setting a TCP retransmission timer in a portable terminal, which performs a handover process, according to the present invention.

Referring to FIG. 6, in step 601, controller 300 of the portable terminal determines if an event for setting a TCP retransmission timer has occurred. If it is determined in step 601 that the event has not occurred, controller 300 goes to step 611 to perform a corresponding function, e.g., maintains an idle state.

If it is determined in step 601 that the event has occurred, controller 300 proceeds to step 603 to obtain an RTT of pre-stored RTTs corresponding to a path to be connected.

In step 605, controller 300 measures Tx power of a transmission signal and a handover latency time. In step 607, controller 300 measures an RTO using the Tx power, the RTT, and the handover latency time.

Here, the portable terminal may measure the Tx power of the transmission signal using the same method as that described with reference to FIG. 5, and the RTO may be set using Equation 3 below:

$$RTO = SRTT + \max(G, K*RTTVAR) + (1 - TXPWRVAR) + HT \quad (3)$$

where SRTT denotes an estimate of a smoothed round trip time and is defined as "SRTT<-R", RTTVAR denotes an estimation of a round trip time variation and is defined as "RTTVAR<-R/2" and R denotes a first measured RTT, and K is defined as "K=4". Also, it is assumed that "TXPWRVAR" denotes a coefficient value of the Tx power of the transmission signal measured using a power control technique of a broadband mobile communication network, and G denotes a clock granularity. Also, it is supposed that "TXPWRVAR" denotes a coefficient value of power of a transmission signal measured using a power control technique of a broadband mobile communication network, HT denotes a coefficient value to be reflected on factors of increasing an RTT, i.e., a handover latency time which necessarily occurs during the performance of a handover, and G is a clock granularity.

If the first RTT is measured, and then an RTT R' is re-measured, the SRTT and the RTTVAR may be calculated using the same method as that described with reference to FIG. 5.

In step 609, controller 300 sets a TCP retransmission timer using the measured RTO and then ends the present process.

In accordance with the present invention as described above, a method of setting a TCP retransmission timer can be used in a wireless network to use a layer protocol, which is developed based on a wired network.

The method can be also used to reduce the latency time while a handover process is performed between WiBro networks or between a WiBro network and a heterogeneous network.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A portable terminal for reducing a latency of a Transmission Control Protocol (TCP), comprising:
  a communicator, transmitting a message for measuring power of a transmission signal to a radio access station (RAS) and receiving a response message corresponding to the message from the RAS;
  a TCP manager instructed by a controller to check and store a round trip time (RTT) required for receiving an acknowledgement (ACK) corresponding to data which is transmitted from the portable terminal to the RAS; and
  the controller instructing the TCP manager to measure the RTT for measuring a retransmission timeout (RTO), wherein when a TCP retransmission timer is set, the controller obtains the RTT, measures the power of the transmission signal of the portable terminal, and sets the RTO using the RTT and the power of the transmission signal.

2. The portable terminal of claim 1, wherein the controller sets the RTO using $$RTO = SRTT + \max(G, K*RTTVAR) + (1 - TXPWRVAR)$$

where SRTT is defined as "SRTT<-R (where R denotes a first measured RTT)" and denotes an estimate of a smoothed round trip time, RTTVAR is defined as "RTTVAR>-R/2 (where R denotes the first measured RTT)" and denotes an estimate of a round trip time variation, K is defined as "K=4", TXPWRVAR denotes a coefficient value of the power of the transmission signal measured using a Wireless Broadband Internet (WiBro) power control technique, and G denotes a clock granularity.

3. The portable terminal of claim 1, wherein when the TCP retransmission timer is set during a performance of a handover, the controller obtains the RTT, measures the power of the transmission signal of the portable terminal and a handover latency time, and sets the RTO using the RTT, the power of the transmission signal, and the handover latency time.

4. The portable terminal of claim 3, wherein the controller sets the RTO using $$RTO = SRTT + \max(G, K*RTTVAR) + (1 - TXPWRVAR) + HT$$

where SRTT denotes an estimate of a smoothed round trip time and is defined as "SRTT<-R (where R denotes a first measured RTT)", RTTVAR denotes an estimation of a round trip time variation and is defined as "RTTVAR<-R/2 (where R denotes the first measured RTT)", K is defined as "K=4", TXPWRVAR denotes a coefficient value of the power of the transmission signal measured using a power control technique of a broadband mobile communication network, HT denotes a coefficient value to be reflected on factors of increasing a RTT, i.e., a handover latency time which necessarily occurs during a performance of a handover, and G is a clock granularity.

5. The portable terminal of claim 3, wherein the controller measures the power of the transmission signal using a report request message and a report response message used in a broadband mobile communication network.

6. The portable terminal of claim 3, wherein the handover comprises at least one type of a handover, which is performed between broadband communication networks and another type of a handover, which is performed between a broadband communication network and a heterogeneous network.

7. A method of reducing a latency of a TCP in a portable terminal, comprising:
  checking an RTT required for receiving an ACK corresponding to data which is transmitted from the portable terminal to an RAS;
  storing the RTT;
  measuring power of a transmission signal of the portable terminal; and setting an RTO using the RTT and the power of the transmission signal.

8. A method of setting a TCP retransmission timer in a portable terminal, comprising:
obtaining a pre-stored RTT if an event for setting the TCP retransmission timer occurs;
measuring power of a transmission signal of the portable terminal;
measuring an RTO using the RTT and the power of the transmission signal; and
setting the TCP retransmission timer using the measured RTO.

9. The method of claim 8, wherein the power of the transmission signal is set using a power control method, which is used in a broadband communication network.

10. The method of claim 9, wherein the power of the transmission signal is measured using a report request message and a report response message.

11. The method of claim 8, wherein the RTO is set using $$RTO=SRTT+\max(G,K*RTTVAR)+(1-TXPWRVAR)$$

wherein SRTT denotes an estimate of a smoothed round trip time and is defined as "SRTT<-R (where R denotes a first measured RTT)", RTTVAR denotes an estimate of a round trip time variation and is defined as "RTTVAR<-R/2 (where R denotes the first measured RTT)", K is defined as "K=4", TXPWRVAR denotes a coefficient value of the power of the transmission signal measured using a Wireless Broadband Internet (WiBro) power control technique, and G denotes a clock granularity.

12. A method of setting a TCP retransmission timer in a portable terminal, which performs a handover process, comprising:
obtaining a pre-stored RTT if an event for setting a TCP retransmission timer occurs;
measuring power of a transmission signal of the portable terminal and a handover latency time;
measuring an RTO using the RTT, the power of the transmission signal, and the handover latency time; and
setting the TCP retransmission timer using the RTO.

13. The method of claim 12, wherein the power of the transmission signal is set using a power control method, which is used in a broadband communication network.

14. The method of claim 13, wherein the power of the transmission signal is measured using a report request message and a report response message.

15. The method of claim 12, wherein the RTO is set using $$RTO=SRTT+\max(G,K*RTTVAR)+(1-TXPWRVAR)+HT$$

wherein SRTT denotes an estimate of a smoothed round trip time and is defined as "SRTT<-R (where R denotes a first measured RTT)", RTTVAR denotes an estimation of a round trip time variation and is defined as "RTTVAR<-R/2 (where R denotes the first measured RTT)", K is defined as "K=4", TXPWRVAR denotes a coefficient value of the power of the transmission signal measured using a power control technique of a broadband mobile communication network, HT denotes a coefficient value to be reflected on factors of increasing a RTT, i.e., a handover latency time which necessarily occurs during a performance of a handover, and G is a clock granularity.

16. The method of claim 15, wherein the handover comprises at least one type of a handover, which is performed between broadband communication networks and another type of a handover, which is performed between a broadband communication network and a heterogeneous network.

17. A method of reducing a latency of a TCP in a portable terminal, comprising:
means for checking an RTT required for receiving an ACK corresponding to data which is transmitted from the portable terminal to an RAS;
means for storing the RTT;
means for measuring power of a transmission signal of the portable terminal; and
means for setting an RTO using the RTT and the power of the transmission signal.

18. A method of setting a TCP retransmission timer in a portable terminal, comprising:
means for obtaining a pre-stored RTT if an event for setting the TCP retransmission timer occurs;
means for measuring power of a transmission signal of the portable terminal;
means for measuring an RTO using the RTT and the power of the transmission signal; and
means for setting the TCP retransmission timer using the measured RTO.

19. A computer-readable recording medium having recorded thereon a program reducing a latency of a TCP in a portable terminal, comprising:
a first segment, for checking an RTT required for receiving an ACK corresponding to data which is transmitted from the portable terminal to an RAS; a second segment, for storing the RTT;
a third segment, for measuring power of a transmission signal of the portable terminal; and
a fourth segment for setting an RTO using the RTT and the power of the transmission signal.

20. A computer-readable recording medium having recorded thereon a program setting a TCP retransmission timer in a portable terminal, comprising:
a first segment, for obtaining a pre-stored RTT if an event for setting the TCP retransmission timer occurs;
a second segment, for measuring power of a transmission signal of the portable terminal;
a third segment, for measuring an RTO using the RTT and the power of the transmission signal; and
a fourth segment, for setting the TCP retransmission timer using the measured RTO.

* * * * *